(12) United States Patent
Carrender

(10) Patent No.: US 6,868,073 B1
(45) Date of Patent: Mar. 15, 2005

(54) DISTANCE/RANGING BY DETERMINATION OF RF PHASE DELTA

(75) Inventor: Curtis Lee Carrender, Richland, WA (US)

(73) Assignee: Battelle Memorial Institute K1-53, Richland, WA (US)

( * ) Notice: Subject to any disclaimer, the term of this patent is extended or adjusted under 35 U.S.C. 154(b) by 976 days.

(21) Appl. No.: 09/588,998

(22) Filed: Jun. 6, 2000

(51) Int. Cl.$^7$ .............................................. H04B 7/005
(52) U.S. Cl. ...................... 370/278; 370/282; 370/313; 340/572.1; 342/127
(58) Field of Search ................................ 370/278, 282, 370/295, 313, 319, 343, 465, 480, 276, 277, 279, 280, 281, 294, 338; 340/825.49, 572.1, 572.2; 342/127–129, 357.08, 367, 450, 458, 47; 375/215, 220; 455/42

(56) References Cited

U.S. PATENT DOCUMENTS

| | | | |
|---|---|---|---|
| 3,098,971 A | * 7/1963 | Richardson | .................. 455/19 |
| 3,299,424 A | * 1/1967 | Vinding | ...................... 340/10.3 |
| 4,075,632 A | 2/1978 | Baldwin et al. | ............. 343/6.8 |
| 4,087,816 A | 5/1978 | Barszczewski et al. | ..... 343/105 |
| 4,283,726 A | 8/1981 | Spence et al. | ............... 343/112 |
| 4,360,810 A | 11/1982 | Landt | .......................... 343/6.5 |
| 4,851,851 A | 7/1989 | Hane | ........................... 342/112 |
| 5,298,904 A | 3/1994 | Olich | ........................... 342/42 |
| 5,528,232 A | * 6/1996 | Verma et al. | .......... 340/825.49 |
| 5,790,022 A | 8/1998 | Delvecchio et al. | ......... 340/539 |
| 6,084,512 A | * 7/2000 | Elberty et al. | ........... 340/572.1 |

* cited by examiner

*Primary Examiner*—Frank Duong
(74) *Attorney, Agent, or Firm*—Seed IP Law Group PLLC

(57) ABSTRACT

A method and system can locate an RF transponder based on phase differences between signals transmitted to the RF transponder. The method transmits from a first transponder to a second transponder first and second signals at first and second frequencies, respectively. The second signal is compared with the first signal and a distance between the first and second transponders is determined based on the phase difference between the first and second signals. In one embodiment, the first transponder is an interrogator, the second transponder is an RF tag, and the RF tag determines the phase difference between the two signals. In another embodiment, the first and second transponders are the interrogator and RF tag, respectively, but the interrogator determines the phase difference between the two signals after the two signal are reflected back to the interrogator. The method can also determine a position (distance and direction) of the RF tag by measuring the distances from two different locations of the interrogator to the RF tag. In one embodiment, the two distances are measured from two spaced-apart antennas of the interrogator. In another embodiment, the interrogator is moved from one known location to another known location. With distance measurements from both known locations, the location of the RF tag can be determined by simple geometry.

24 Claims, 3 Drawing Sheets

US 6,868,073 B1

DISTANCE/RANGING BY DETERMINATION OF RF PHASE DELTA

FIELD OF THE INVENTION

The present invention relates to radio frequency identification tags (RF tags), and in particular, to an RF communication system and method for locating RF tags.

BACKGROUND OF THE INVENTION

Remote communication utilizing wireless equipment typically relies on radio frequency (RF) technology, which is employed in many industries. One application of RF technology is in locating, identifying, and tracking objects, such as animals, inventory, and vehicles.

RF identification (RFID) tag systems have been developed that facilitate remote monitoring of remote objects. As shown in FIG. 1, a basic RFID system 10 includes two components: an interrogator or reader 12, and a transponder (commonly called an RF tag) 14. The interrogator 12 and RF tag 14 include respective antennas 16, 18. In operation, the interrogator 12 transmits through its antenna 16 a radio frequency interrogation signal 20 to the antenna 18 of the RF tag 14. In response to receiving the interrogation signal 20, the RF tag 14 produces an amplitude-modulated response signal 22 that is transmitted back to the interrogator 12 through the tag antenna 18 by a process known as backscatter.

The conventional RF tag 14 includes an amplitude modulator 24 with a switch 26, such as a MOS transistor, connected between the tag antenna 18 and ground. When the RF tag 14 is activated by the interrogation signal 20, a driver (not shown) creates a modulating signal 28 based on an information code, typically an identification code, stored in a non-volatile memory (not shown) of the RF tag 14. The modulating signal 28 is applied to a control terminal of the switch 26 which causes the switch 26 to alternately open and close. When the switch 26 is open, the tag antenna 18 reflects a portion of the interrogation signal 20 back to the interrogator 12 as a reflected portion 30 of the response signal 22. When the switch 26 is closed, the interrogation signal 20 travels through the switch 26 to ground, without being reflected, thereby creating a null portion 32 of the response signal 22. In other words, the interrogation signal 20 is amplitude-modulated to produce the response signal 22 by alternately reflecting and absorbing the interrogation signal 20 according to the modulating signal 28, which is characteristic of the stored information code. The RF tag 14 could also be modified so that the interrogation signal is reflected when the switch 26 is closed and absorbed when the switch 26 is open. Upon receiving the response signal 22, the interrogator 12 demodulates the response signal 22 to decode the information code represented by the response signal.

The substantial advantage of RFID systems is the non-contact, non-line-of-sight capability of the technology. The interrogator 12 emits the interrogation signal 20 with a range from one inch to one hundred feet or more, depending upon its power output and the radio frequency used. Tags can be read through a variety of substances such as smell, fog, ice, paint, dirt, and other visually and environmentally challenging conditions where bar codes or other optically-read technologies would be useless. RF tags can also be read at remarkable speeds, in most cases responding in less than one hundred milliseconds.

A typical RF tag system 10 will contain a number of RF tags 14 and the interrogator 12. There are three main categories of RF tags. These are beam-powered passive tags, battery-powered semi-passive tags, and active tags. Each operates in fundamentally different ways.

The beam-powered RF tag is often referred to as a passive device because it derives the energy needed for its operation from the interrogation signal beamed at it. The tag rectifies the field and changes the reflective characteristics of the tag itself, creating a change in reflectivity that is seen at the interrogator. A battery-powered semi-passive RFID tag operates in a similar fashion, modulating its RF cross section in order to reflect a delta to the interrogator to develop a communication link. Here, the battery is the source of the tag's operational power. Finally, in the active RF tag, a transmitter is used to create its own radio frequency energy powered by the battery.

The range of communication for such tags varies according to the transmission power of the interrogator 12 and the RF tag 14. Battery-powered tags operating at 2,450 MHz have traditionally been limited to less than ten meters in range. However, devices with sufficient power can reach up to 200 meters in range, depending on the frequency and environmental characteristics.

Although prior art communication systems can communicate with an RF tag that is within a certain distance of the interrogator (depending on the interrogator power), the interrogator cannot determine the location of the RF tag. For example, the prior art interrogator may be able to determine that there is an RF tag within 100 meters of the interrogator, but cannot determine whether it is 90 meters away or 45 meters away. In addition, the prior art interrogator cannot determine whether the RF tag is in front of, behind, or to either side of the interrogator. There are numerous applications for which such location information is important.

SUMMARY OF THE INVENTION

Embodiments of the present invention are directed to a method and system for locating an RF transponder. The method transmits from a first transponder to a second transponder first and second signals at different frequencies, respectively. The second signal is compared with the first signal and a distance between the first and second transponders is determined based on a phase difference between the first and second signals. In one embodiment, the first transponder is an interrogator, the second transponder is an RF tag, and the RF tag determines the phase difference between the two signals. In another embodiment, the first and second transponders are the interrogator and RF tag, respectively, but the interrogator determines the phase difference between the two signals after the two signal are reflected back to the interrogator. Alternatively, the roles of the interrogator and RF tag are reversed in other embodiments.

The comparison and determination of a phase difference between the two signals are performed in one embodiment by phase locking one the first signal to produce a reference signal. The reference signal is then mixed with the second signal to produce a mixed signal. A counter determines the phase difference by counting the number of nulls or peaks in the mixed signal, the nulls corresponding to respective portions of the signals that are of opposite phase to each other and the peaks corresponding to respective portions of the signals that are in phase with each other. The number of nulls or peaks within a period is directly related to the distance between the interrogator and the RF tag. In a preferred embodiment, the second signal is a frequency modulated signal that includes plural frequency portions each at different frequencies and the counter counts nulls or peaks in plural different mixed signals produced by mixing the respective frequency portions with the reference signal.

The method can also determine a position of the RF tag by measuring the distances from two different locations of the interrogator to the RF tag. In one embodiment, the two distances are measured from two spaced-apart antennas of the interrogator. In another embodiment, the interrogator is moved from one known location to another known location. With distance measurements from both known locations, the location of the RF tag can be determined by simple geometry.

DETAILED DESCRIPTION OF THE INVENTION

Figure 2:
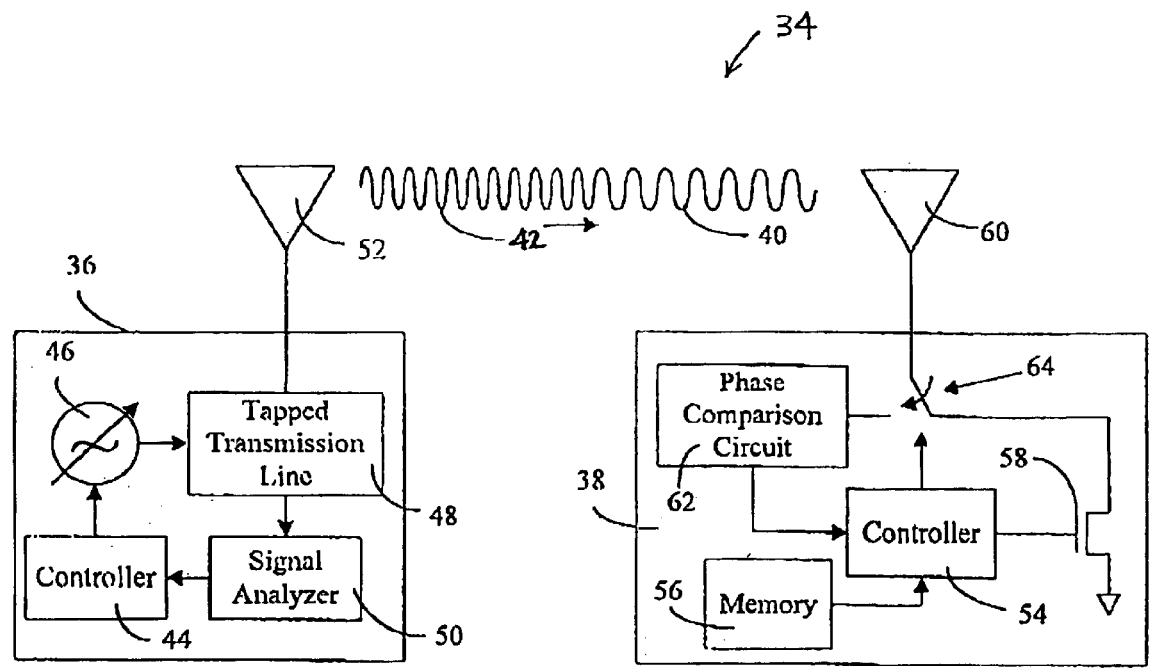
FIG. 2 is a schematic diagram of an RF communication system for locating an RF tag according to an embodiment of the present invention.

As shown in FIG. 2, an embodiment of the present invention is directed to an RF communication system 34 that determines a distance between a reader or interrogator 36 and an RE transponder or tag 38. The system 34 determines the distance by transmitting from the interrogator 36 to the RF tag 38 a first signal 40 at a first frequency and a frequency modulated second signal 42 at a second frequency. The RF tag 38 compares the signals 40, 42 and determines a phase difference between the two signals. The distance between the interrogator 36 and the RF tag 38 is directed related to that detected phase difference.

The interrogator 36 includes a controller 44, a variable signal source 46, a tapped transmission line 48, a signal analyzer 50, and an antenna 52. The controller 44 can be any general purpose processor, such as a known microprocessor, or can be specifically designed to control the operation of the interrogator 36 as described herein. Examples of the tapped transmission line 48 and signal analyzer 50 can be found in U.S. Pat. No. 4,360,810 to Landt, which is incorporated by reference herein in its entirety. The tapped transmission line 48 enables the single antenna 52 to be used to transmit and receive signals simultaneously. Of course other systems for receiving and decoding the response signal from the RF tag 38 could be employed, such as the system shown in U.S. Pat. No. 4,075,632, which is incorporated herein by reference.

The RF tag 38 includes a controller 54, a memory 56, a modulating switch 58, an antenna 60, a phase comparison circuit 62, and a mode switch 64. The controller 54 can be any general purpose processor, such as a known microprocessor, programmed to control the operation of the RF tag 38 as described herein or can be specifically designed to provide the control functions. The mode switch 64 alternately couples the antenna 60 to either the modulating switch 58 or the phase comparison circuit 62 under the control of the controller 54 as discussed in more detail below.

Stored in the memory 56 is an information code, such as an identification code that identifies the RF tag 38 and/or an object to which the RF tag is attached. Alternatively, the information code could represent numerous other pieces of information, such as the environmental conditions surrounding the RF tag 38, inventory information associated with the RF tag, or information that was previously written to the RF tag before or after the RF tag was placed into service. The memory 56 can be implemented with any type of memory, but preferably is non-volatile memory so that the information code is not lost when power is lost.

Figure 1:
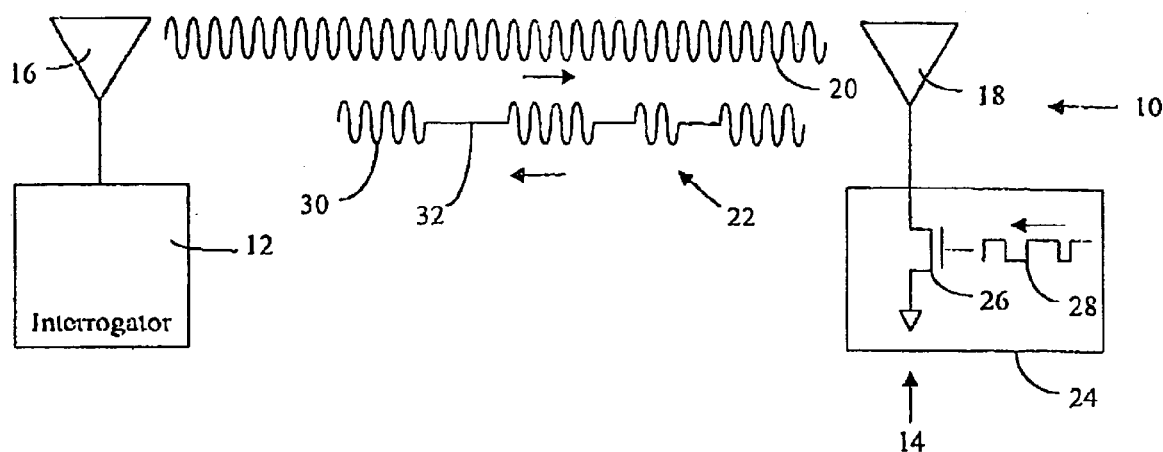
FIG. 1 is a schematic diagram of a prior art RF communication system employing amplitude-modulated backscatter signals.

During a tag identification mode, the interrogator 36 transmits a continuous wave interrogation signal to the RF tag 38 in an attempt to determine the identity of the RF tag. Based on the identification code stored in the memory 56, the controller 54 of the RF tag 38 creates a modulating signal that is applied to the modulating switch 58, which modulates the interrogation signal to produce a backscatter response signal that is transmitted back to the interrogator 36. The modulation of the interrogation signal can be amplitude-modulation as described above with respect to FIG. 1 or can be phase-modulation as described in a United States Patent Application Ser. No. 09/588,997 entitled Phase Modulation in RF Tag, which is being filed on the same date as the present application and which is incorporated herein by reference.

The response signal from the RF tag 38 is received by the interrogator 36 and mixed with the interrogation signal in the tapped transmission line 48. The tapped transmission line 48 and signal analyzer 50 combine to demodulate the response signal to determine the information code of the RF tag 38 and pass the information code to the controller 44. The controller 44 determines whether the information code is valid, and if so, transmits an acknowledgement signal to the RF tag 38.

After the interrogator 36 acknowledges receipt of the information code, the RF tag 38 switches into a distance determination mode by coupling the phase comparison circuit 62 to the antenna 60 via the mode switch 64. In the distance determination mode, the interrogator 36 transmits the first and second signals 40, 42 to the RF tag 38. In a preferred embodiment, the second signal 42 is transmitted after the first signal 40 is transmitted, but the signals could be transmitted simultaneously by separate antennas without departing from the invention. The controller 44 of the interrogator 36 can be programmed to cause the variable signal source 46 transmit only the first signal 40 at the first frequency followed by the second signal 42 at the second frequency. Alternatively, the controller 44 can be programmed to cause the signal source 46 to transmit a frequency ramp that starts at the first frequency and includes the second frequency, that is, the first and second signals 40, 42 can be part of the frequency ramp. Or, the signal source 46 can randomly or pseudo-randomly changes frequencies to transmit the first and second signals 40, 42. The invention includes any combination of two or more frequencies.

The phase comparison circuit 62 of the RF tag 38 compares the signals 40, 42 and determines a phase difference between the two signals. The distance between the interrogator 36 and the RF tag 38 is directed related to that detected phase difference. The phase comparison circuit 62 passes to the controller 54 information indicative of the phase difference, which the controller can use to compute the distance between the interrogator 36 and the RF tag 3S.

Figure 3:
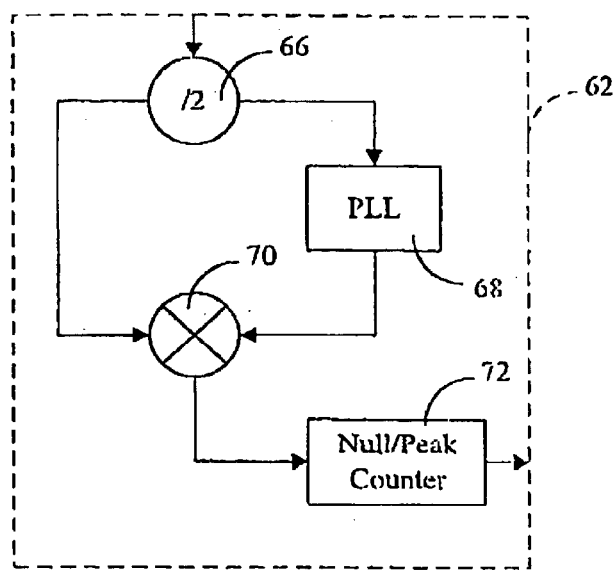
FIG. 3 is a schematic diagram of a phase comparison circuit employed in the system of FIG. 2.

Shown in FIG. 3 is a more detailed diagram of the phase comparison circuit 62 of the RF tag 38. The phase comparison circuit 62 includes a signal divider 66, phased lock loop 68, mixer 70, and null/peak counter 72. The signal divider 66 divides the incoming first signal 40 into two identical signals, one of which going to the phase lock loop 68. The phase lock loop 68 phase locks, and preferably amplitude locks, on the incoming signal to produce a reference signal that is substantially identical to the incoming first signal 40. The phase lock loop 68 preferably is selected to provide a robust phase lock with a long lock and hold capability. The reference signal is passed to the mixer 70 which also receives the other one of the signals from the signal divider 66 and produces a mixed output signal that is a combination of the two signals input to the mixer. Initially, the mixed output signal is a combination of the first signal 40 received from the signal divider 66 and the reference signal, which is substantially identical to the first signal 40, so the mixed output signal is equal to the first signal 40 except with larger peaks and valleys.

When the signal received by the phase comparison circuit 62 changes from the first signal 40 to the second signal 42, the mixer 40 receives at one input the second signal 42 from the signal divider 66 and at the other input the reference signal which is substantially identical to the first signal 40. The mixer 70 combines the second signal 42 with the reference signal, resulting in a mixed output signal with two frequency components. At regular points in time and space, the second signal 42 will be at a maximum while the reference signal is at a minimum, resulting in null points in the mixed output signal. Consecutive null points of the mixed output signal will be separated by peak points at which both the second and reference signals are at a maximum, or both are at a minimum. The null/peak counter 72 counts either the null points or the peak points in the mixed output signal and provides the resulting count to the controller 54. The null/peak counter 70 can be either an analog counter or can include an analog/digital converter and a digital signal processor to determine the count digitally.

In one embodiment, the frequencies of the first and second signals 40, 42 are known to the controller 54, and thus, the controller uses the count provided by the null/peak counter 72 to compute the distance between the interrogator 36 and the RF tag 38. Alternatively, the controller can incorporate the count into a count signal that is transmitted by the RF tag 38 back to the interrogator 36. The controller 44 would then use the count and the frequencies of the first and second signals 40, 42 to determine the distance between the interrogator 36 and the RF tag 38.

An important aspect is the fact that both backscatter and transmitter systems can determine the distance between an interrogator and an RF tag and the location of the RF tag using such phase differences and null/peak counts.

An example may help one to understand how the distance between the interrogator 36 and RF tag 38 can be determined. A first signal at 880 MHz has a wavelength of 34.0909091 cm and a second signal at 884 MHz has a wavelength of 33.9366516 cm. At a distance of about 37.5 meters (110 wavelengths of the first signal and 110.5 wavelengths of the second signal), the first and second signals will be 180 degrees out of phase, resulting in a null point in the mixed signal output by the mixer 70. At each additional 75 m, there will be an additional null point, and thus, the distance between the interrogator 36 and the RF tag 38 can be determined with an accuracy of ±37 m using a first signal at 880 MHz and a second signal at 884 MHz.

The accuracy can be improved by using a frequency modulated second signal rather than keeping the second signal at only the second frequency. For example, assume the second signal includes a first portion at 883 MHz, a second portion at 884 MHz, and a third portion at 890 MHz. Mixing each of those portions of the second signal with the first signal results in first, second, and the mixed signals with nulls at distances of 50, 37.5, and 15 meters, respectively. Therefore, if the counter counts 1 null for each of the first and second mixed signals and 3 nulls for the third nixed signal, then the controller can determine that the distance between the interrogator 36 and RF tag 38 is between 50 and 60 meters. If the distance were less than 50 meters, then the first mixed signal would have had no nulls; and if the distance were more than 60 meters, then the third mixed signal would have had 4 nulls. Of course, with more than three frequency portions of the second signal, the accuracy of the distance determination can be improved further. Moreover, rather than comparing all frequency portions of the second signal to the first signal, one could compare some of the frequency portions with each other.

In one embodiment, the interrogator 36 employs a quarter-wave dipole antenna as the antenna 52, but any type of antenna could be employed. In another embodiment, the antenna 52 is a phased-array antenna, which enables the interrogator 36 to determine the direction of the RF tag 38 relative to the interrogator. By determining both the direction and distance of the RF tag 38 relative to the interrogator 36, the interrogator accurately determines the location of the RF tag 38.

Figure 4:
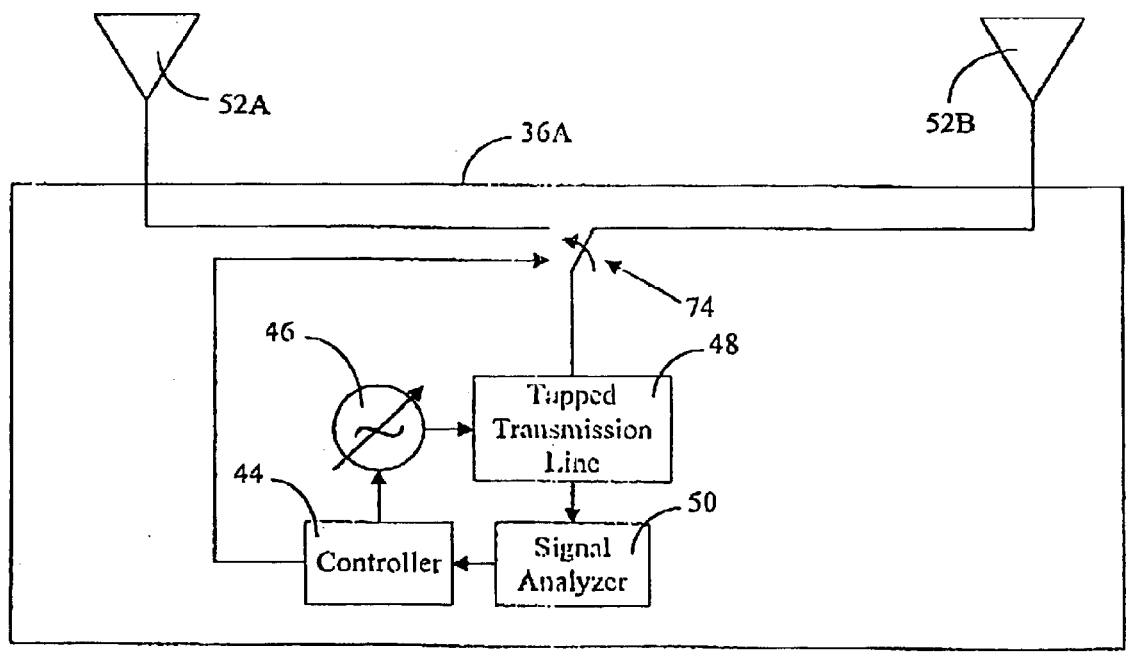
FIG. 4 is an alternate embodiment of an interrogator for use in the system of FIG. 2.

Shown in FIG. 4 is an alternate interrogator 36A that can determine the direction and distance of the RF tag 38 relative to the interrogator 36A without employing a direction-determining antenna like the phased-array antenna. Instead, the interrogator 36A employs first and second antennas 52A, 52B that are each connected by an antenna switch 74 to the same tapped transmission line 48 as in the interrogator 36 of FIG. 2. To determine the location (distance and direction) of the RF tag 38, the interrogator 36A determines first and second distances from the first and second antennas 52A, 52B, respectively, to the RF tag according to the same scheme as described above. That is, the interrogator 36A first transmits the first and second signals via the first antenna 52A, the RF tag 38 counts the nulls in the mixed signal output from the mixer 70, and the controller 44 calculates the first distance; and then the process is repeated using the second antenna 52A to determine the second distance. The controller 44 controls which antenna 52A, 52B is used at a time by controlling the antenna switch 74. The controller 44 uses the first and second distances and the known distance between the two antennas 52A, 52B to compute the location of the RF tag 38 using simple geometry.

Figure 5:
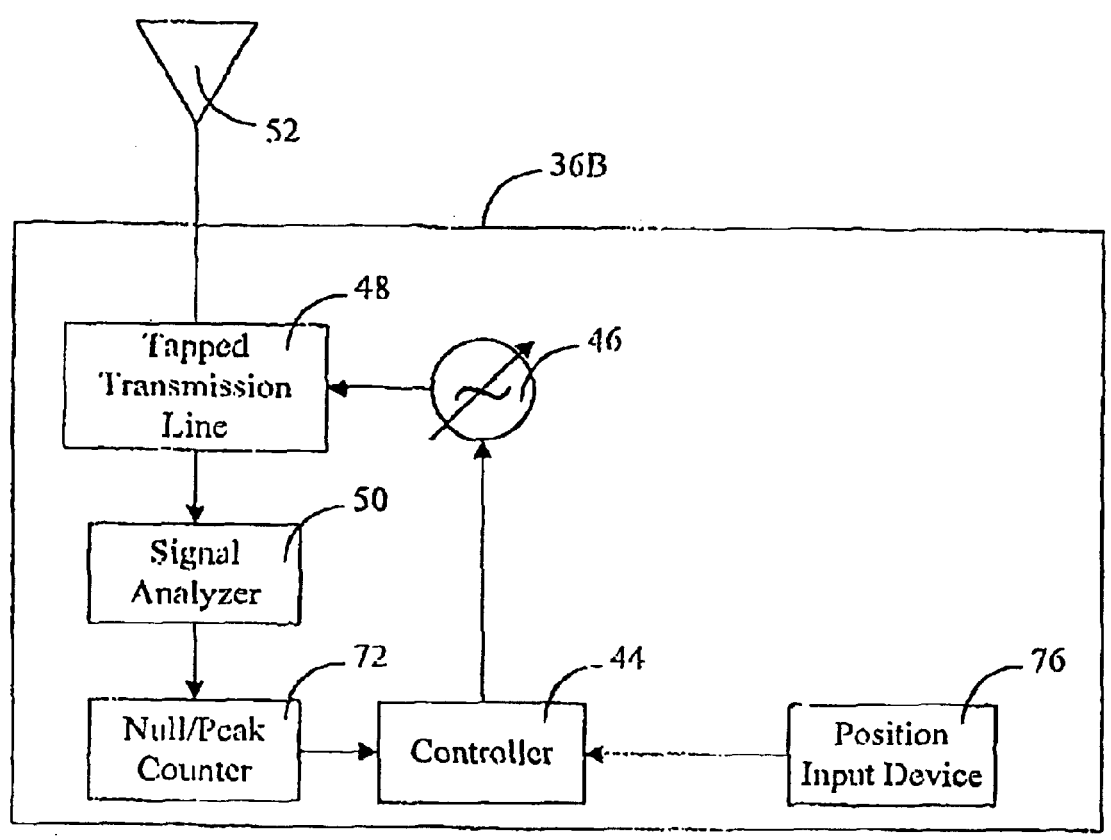
FIG. 5 is an alternate interrogator for locating an RF tag according to an embodiment of the present invention.

Shown in FIG. 5 is another alternate interrogator 36B that can locate (distance and direction) the RF tag 38 or any prior art RF tag without modifications to the prior art RF tags. The interrogator 36B includes, in addition to the same elements 44–52 of the interrogator 36 of FIG. 2, a position input device 76, and the null/peak counter 72. The position input device 76 inputs to the controller 44 the positions of the interrogator 36B at two different locations. The interrogator 36B takes a distance measurement to the RF tag at each of the two different locations of the interrogator and uses those distance measurements, together with the position information provided by the position input device 76, to compute the location of the RF tag. The position input device can be a simple keyboard or other device through which a user inputs in the position of the interrogator or can be an accelerometer or other device that measures a position change from a first location to a second location of the interrogator. Alternatively, the interrogator 36B can be moved between two locations for which position information is preprogrammed into the controller 44 to avoid having to input new position information with each distance determination.

By incorporating the null/peak counter 72 in the interrogator 36B rather than in the RF tag 38, the interrogator 36B can determine the location of any RF tag. In the distance determination mode, the controller 44 causes the variable signal source 46 to transmit the first and second signals 40, 42 via the antenna 52. The RF tag reflects and modulates the first and second signals 40, 42. The modulation is done to distinguish the RF tag from other objects such as metal cans or other reflecting objects. The reflected first signal 40 is received by the antenna 52 and mixed with the second signal 42 by the tapped transmission line 48. The null/peak counter 72 counts the nulls or peaks in the mixed signal output by the tapped transmission line 48 and the controller 44 determines a first distance between the interrogator 36B and the RF tag based on the null or peak count. It should be appreciated that the distance determination algorithm used by the controller must compensate for the fact that the total path length of the communication is now out and back.

The user then moves the interrogator 36B to a second location and the process is repeated to determine a second distance between the interrogator 36B and the RF tag. The controller 44 determines the location of the RF tag based on the first and second distances and on the interrogator location information provided by the position input device 76. To facilitate its movement, the interrogator 36B, like the interrogators 36, 36A, can be provided as a hand-held device.

Although the embodiments shown in FIGS. 2–5 show the interrogators 36, 36A, 36B incorporating the variable signal source 46, it should be appreciated that the roles of the interrogator and the RF tag can be completely reversed. That is, the RF tag could transmit the first and second signals to the interrogator, and either the interrogator or the RF tag could perform any the distance determination functions. In may be preferable to incorporate many or all of the distance determination functions on the interrogator to keep the size of the RF tag to a minimum, but it is not essential to the invention.

CLOSURE

In view of the foregoing, it will be appreciated that the RF communication system discussed herein provides important advantages over prior art systems. By providing the ability to locate an RF tag, and any object attached to the RF tag, the RF communication system discussed above greatly extends the range of applications to which RF tag technology can be applied. For example, the RF communication system discussed above can be employed to locate lost weapons on a battlefield, animals across a large property, and any inventory object within a warehouse.

Finally it will be clear that many modifications and variants may be introduced to the inventive embodiments described and illustrated herein, all of which come within the scope of the invention as defined in the accompanying claims.

I claim:

1. A method of radio frequency communication, the method comprising:

transmitting a first signal at a first frequency from a first transponder to a second transponder;

phase locking on the first signal to create a reference signal;

transmitting a second signal at a second frequency from the first transponder to the second transponder;

comparing the second signal to the reference signal, comprising mixing the reference signal with the second signal to obtain a mixed signal; and determining a distance between the first and second transponders based on a phase difference between the second and reference signals, comprising determining how many nulls or peaks there are in the mixed signal.

2. The method of claim 1 wherein the first transponder is an interrogator and the second transponder is an RF tag.

3. The method of claim 2, further comprising receiving a radio frequency interrogation signal from the interrogator;

modulating the interrogation signal according to an information code to produce a response signal; and transmitting the response signal from the RF tag to the interrogator.

4. The method of claim 1 wherein:

the step of transmitting the second signal includes transmitting a plurality of frequency portions each at a different frequency;

the comparing step includes comparing each of the frequency portions to the reference signal by mixing each of the frequency portions with the reference signal to produce a plurality of mixed signals; and the distance determining step includes counting nulls or peaks in each of the mixed signals.

5. The method of claim 1 wherein the step of determining how many nulls or peaks there are in the mixed signal is performed at the second transponder and the step of determining the distance between the first and second transponders includes transmitting to the first transponder an indication of the how many nulls or peaks there are in the mixed signal and determining the distance from the indication and the first and second frequencies.

6. The method of claim 1 wherein the distance determined is a first distance and the first and second signals are transmitted via a first antenna of the first transponder, the first transponder having a second antenna spaced apart from the first antenna, the method further comprising:

determining a second distance between the second antenna of the first transponder and the second transponder based on a phase difference between the signals transmitted through the second antenna; and determining a direction from the first transponder to the second transponder based on the first and second distances and a distance between the first and second antennas.

7. The method of claim 1 wherein the reference signal is a first reference signal and the first and second signals are transmitted via a first antenna of the first transponder, the method further comprising:

transmitting a third signal at the first frequency from a second antenna of the first transponder to the second transponder;

phase locking on the third signal to create a second reference signal;

transmitting a fourth signal at the second frequency from the second antenna of the first transponder to the second transponder;

comparing the fourth signal to the second reference signal;

determining a distance between the second antenna of the first transponder and the second transponder based on a phase difference between the fourth signal and the second reference signal; and determining a location of the second transponder based on the distances determined.

8. The method of claim 1 wherein the second signal is a frequency modulated signal that includes a plurality of frequency portions at a plurality of frequencies.

9. A method of radio frequency communication, the method comprising:

transmitting a first signal at a first frequency from a first transponder to a second transponder;

transmitting a second signal at a second frequency from the first transponder to the second transponder;

comparing the second signal to the first signal, and phase locking on the first signal to create a reference signal and mixing the reference signal with the second signal to obtain a mixed signal; and determining a distance between the first and second transponders based on a phase difference between the first and second signals, comprising determining how many nulls or peaks there are in the mixed signal.

10. The method of claim 9 wherein the second signal is a frequency modulated signal that includes a plurality of frequency portions at a plurality of frequencies.

11. The method of claim 10 wherein the first transponder is an interrogator and the second transponder is an RF tag.

12. The method of claim 11, further comprising:

receiving a radio frequency interrogation signal from the interrogator;

modulating the interrogation signal according to an information code to produce a response signal; and transmitting the response signal from the RF tag to the interrogator.

13. The method of claim 9 wherein:

the step of transmitting the second signal includes transmitting a plurality of frequency portions each at a different frequency;

the comparing step includes comparing each of the frequency portions to the reference signal by mixing each of the frequency portions with the reference signal to produce a plurality of mixed signals; and the distance determining step includes counting nulls or peaks in each of the mixed signals.

14. The method of claim 10 wherein the step of determining how many nulls or peaks there are in the mixed signal is performed at the second transponder and the step of determining the distance between the first and second transponders includes transmitting to the first transponder an indication of the how many nulls or peaks there are in the mixed signal and determining the distance from the indication and the first and second frequencies.

15. The method of claim 10 wherein the distance determined is a first distance and the first and second signals are transmitted via a first antenna of the first transponder, the first transponder having a second antenna spaced apart from the first antenna, the method further comprising:

determining a second distance between the second antenna of the first transponder and the second transponder based on a phase difference between the signals transmitted through the second antenna; and determining a direction from the first transponder to the second transponder based on the first and second distances and a distance between the first and second antennas.

16. The method of claim 10 wherein the first and second signals are reflected back to the first transponder by the second transponder and the comparing and determining steps are performed by the first transponder.

17. The method of claim 10 wherein the distance determined is a first distance, the method further comprising:

moving the first transponder from a first position, from which the first distance is determined, to a second position;

transmitting a third signal at the first frequency from the first transponder to the second transponder;

transmitting a fourth signal at the second frequency from the first transponder to the second transponder;

comparing the fourth signal to the third signal;

determining a second distance between the first and second transponders based on a phase difference between the third and fourth signals; and determining a location of the second transponder based on the first and second distances and the first and second positions of the first transponder.

18. A radio frequency transponder, comprising:

an antenna that receives from an interrogator first and second signals having first and second frequencies, respectively;

a phase lock loop coupled to the antenna and structured to phase lock on the first signal to create a reference signal;

a comparator coupled to the antenna and phase lock loop and structured to compare the second signal to the reference signal, the comparator comprising a mixer structured to mix the reference signal with the second signal to obtain a mixed signal; and means for determining a phase difference between the second and reference signals, the phase difference corresponding to a distance between the first and second transponders, the means for determining comprising a counter coupled to the mixer and structured to determine a null count of how many nulls there are in the mixed signal.

19. A radio frequency interrogator, comprising:

a variable frequency signal source that produces a first signal at a first frequency and a second signal at a second frequency;

antenna means coupled to the signal source for transmitting to a transponder the first and second signals and for receiving the first and second signals reflected back from the transponder;

a comparator coupled to the antenna and structured to compare the reflected second signal to the reflected first signal, the comparator comprising a mixer that mixes the second signal with the reflected first signal to produce a mixed signal; and means for determining a distance between the first and second transponders based on a phase difference between the reflected first signal and the second signal, the means for determining comprising a null or peak counter that counts nulls or peaks in the mixed signal.

20. A radio frequency communication system, comprising:

an interrogator that transmits a radio frequency interrogation signal and receives a response signal; and a transponder that receives the interrogation signal and transmits the response signal to the interrogator, the transponder including:

a memory that stores an information code;

a modulator coupled to the memory and structured to produce the response signal by modulating the interrogation signal according to the information code wherein a first one of the transponder and interrogator includes a variable frequency source that transmits to a second one of the transponder and interrogator a first signal at a first frequency followed by a second signal at a second frequency; one of the transponder and interrogator includes a phase comparison circuit that detects phase shifts in the second signal relative to the first signal; and one of the transponder and interrogator includes a distance determiner that determines the transponder and the interrogator based on the phase shifts; and the phase comparison circuit comprising a phase lock loop that phase locks on the first signal to produce a reference signal; and a mixer coupled to the phase lock loop and structured to mix the reference signal with the second signal to obtain a mixed signal and a counter coupled to the mixer and structured to determine one of a null and peak count of how many nulls or peaks there are in the mixed signal.

21. The communication system of claim 20 wherein the interrogator includes the variable frequency source and the transponder includes the phase comparison circuit.

22. The communication system of claim 20 wherein the second signal is a frequency modulated signal.

23. The communication system of claim 20 wherein the interrogator includes means for calculating the distance between the interrogator and the transponder based on the null or peak count which is sent to the interrogator by the transponder.

24. The communication system of claim 20 wherein the interrogator includes the variable frequency source and the phase comparison circuit.

\* \* \* \* \*

UNITED STATES PATENT AND TRADEMARK OFFICE
CERTIFICATE OF CORRECTION

PATENT NO. : 6,868,073 B1
DATED : March 15, 2005
INVENTOR(S) : Curtis Lee Carrendar It is certified that error appears in the above-identified patent and that said Letters Patent is hereby corrected as shown below:

Column 9,
Lines 23, 43, 51 and 64, "10" should read as -- 9 --.

Column 10,
Line 1, "10" should read as -- 9 --.

Signed and Sealed this

Sixth Day of September, 2005

JON W. DUDAS
*Director of the United States Patent and Trademark Office*